(12) United States Patent
Livshitz et al.

(10) Patent No.: US 10,212,457 B1
(45) Date of Patent: Feb. 19, 2019

(54) COORDINATED PIECEWISE BEZIER VECTORIZATION

(71) Applicant: Evernote Corporation, Redwood City, CA (US)

(72) Inventors: Eugene Livshitz, San Mateo, CA (US); Ilia Buriak, Moscow (RU); Natalia Galaktionova, Moscow (RU); Alexander Pashintsev, Cupertino, CA (US); Boris Gorbatov, Sunnyvale, CA (US)

(73) Assignee: EVERNOTE CORPORATION, Redwood City, CA (US)

( * ) Notice: Subject to any disclaimer, the term of this patent is extended or adjusted under 35 U.S.C. 154(b) by 0 days.

(21) Appl. No.: 15/349,543

(22) Filed: Nov. 11, 2016

Related U.S. Application Data

(60) Provisional application No. 62/256,332, filed on Nov. 17, 2015.

(51) Int. Cl.
| | | |
|---|---|---|
| G06K 9/00 | (2006.01) |
| H04N 19/94 | (2014.01) |
| G06T 7/00 | (2017.01) |
| G06T 7/60 | (2017.01) |
| G06T 5/00 | (2006.01) |
| G06T 5/20 | (2006.01) |
| G06T 3/40 | (2006.01) |

(52) U.S. Cl.
CPC ............ *H04N 19/94* (2014.11); *G06T 3/403* (2013.01); *G06T 3/4023* (2013.01); *G06T 5/007* (2013.01); *G06T 5/20* (2013.01); *G06T 7/0083* (2013.01); *G06T 7/0085* (2013.01); *G06T 7/60* (2013.01)

(58) Field of Classification Search
CPC .................. G06K 9/4671; G06K 9/481; G06T 2207/20061; G06T 2210/32; G06T 9/00
See application file for complete search history.

(56) References Cited

U.S. PATENT DOCUMENTS 7,873,218 B2 * 1/2011 Uzawa ...................... G06T 9/20
345/442
9,531,957 B1 * 12/2016 George .............. H04N 5/23293

* cited by examiner

*Primary Examiner* — Euengnan Yeh
(74) *Attorney, Agent, or Firm* — Morgan, Lewis & Bockius LLP

(57) ABSTRACT

Vectorizing a raster image includes identifying a connectivity component in the raster image, detecting a contour of the connectivity component, building tangent vectors for each point of the contour, for each sharp angle of the contour, positioning a segmentation point of two segments at a point thereof, for each location of high curvature of the contour, positioning segments proximal thereto, composing an optimization task to approximate a piecewize Bezier curve, solving the optimization task to provide a vectorization of the raster image, and, in response to there not being a sufficient number of segments, adding additional segments. Vectorizing a raster image may also include applying perspective, color, brightness and contrast correction to the raster image and building a binary black-white representation of the raster image prior to identifying the connectivity component. The optimization task may minimize a root-mean square deviation of the piecewize Bezier curve.

24 Claims, 4 Drawing Sheets

COORDINATED PIECEWISE BEZIER VECTORIZATION

CROSS-REFERENCE TO RELATED APPLICATIONS

This application claims priority to U.S. Prov. App. No. 62/256,332, filed Nov. 17, 2015, and entitled "COORDINATED PIECEWISE BEZIER VECTORIZATION," which is incorporated by reference herein.

TECHNICAL FIELD

This application is directed to the field of image processing, and more particularly to the field of approximation of contours in raster images with an optimally segmented Bezier curve.

BACKGROUND OF THE INVENTION

Mobile phones with digital cameras are broadly available in nearly every worldwide market. According to market statistics and forecasts, by 2018, annual smartphone shipments are expected to grow to 1.87 billion units; over 80% of all mobile phones will be arriving to customers with embedded digital cameras. New shipments will expand the already massive current audience of approximately 4.5 billion mobile phone users and seven billion mobile subscribers; new units will also update mobile phones currently used by the subscribers. Annual sales of phone cameras to mobile phone manufacturers for embedding into smartphones and feature phones are projected at 1.5 billion units.

The volume of photographs taken with phone cameras is also growing rapidly. According to recent survey by Pew Research, photographing with phone cameras is the single most popular activity of smartphone owners utilized by 82% of users. According to recent studies, about 27% of all photos have been taken with smartphones. Images from smartphone cameras are more and more dominating social photo sharing sites.

Hundreds of millions smartphone users are increasingly incorporating smartphone cameras into their information capturing and processing lifestyles at work and at home. Digitizing and capturing paper based information becomes ubiquitous. A recent survey of smartphone usage by millennials has revealed that 68% of survey respondents have been introduced to mobile information capturing via mobile check deposits and 83% think that mobile capture will be part of all mobile transactions within the next five years. Additionally, business oriented users are capturing meeting materials and notes from whiteboards, Moleskine and other paper notebooks and other handwritten media. A 2015 study of corporate whiteboard users has discovered that 84% of survey participants experienced a need to store whiteboard content; accordingly, 72% had taken a photograph of a whiteboard at least once, while 29% had at least 10 images of whiteboards saved on their camera enabled smartphones or tablets. The arrival of unified multi-platform content management systems, such as the Evernote service and software developed by Evernote Corporation of Redwood City, Calif., aimed at capturing, storing, displaying and modifying all types and formats of information across all user devices, has facilitated and stimulated capturing of typed and handwritten text, documents, forms, checks, charts, drawings and other types and formats of real-life content with smartphone cameras, as well as other types of cameras and scanners.

Content captured by users using smartphone and other cameras or scanners is initially stored in a content management system as a raster image. Users can view and share such content, but object based processing—selective text modification or copy-pasting, operations with handwritten doodles or charts, etc.—is not instantly available. In response to this challenge, a variety of content vectorization mechanisms and systems have been developed, including Roberts, Canny and Sobel edge detection methods, Potrace and Vextractor vectorization software, etc. These mechanisms aim at converting image content into line art and other traceable object collections.

Notwithstanding a significant progress in vectorization technologies, existing algorithms suffer from significant discrepancies between an original image and a vector representation of the original image. For example, Bezier curves that are broadly used in vectorization are often applied inconsistently and distort characteristic features of handwritten, typed and hand-drawn shapes, such as sharp angles and high curvature pieces of a trajectory, which especially affects vectorization accuracy and processing capabilities for artistic hand-drawn and printed images.

Accordingly, it is useful to develop efficient and accurate mechanisms for vectorization of content captured on raster images.

SUMMARY OF THE INVENTION

According to the system described herein, vectorizing a raster image includes identifying a connectivity component in the raster image, detecting a contour of the connectivity component, building tangent vectors for each point of the contour, for each sharp angle of the contour, positioning a segmentation point of two segments at a point thereof, for each location of high curvature of the contour, positioning segments proximal thereto, composing an optimization task to approximate a piecewize Bezier curve, solving the optimization task to provide a vectorization of the raster image, and, in response to there not being a sufficient number of segments, adding additional segments. Vectorizing a raster image may also include applying perspective, color, brightness and contrast correction to the raster image and building a binary black-white representation of the raster image prior to identifying the connectivity component. The optimization task may minimize a root-mean square deviation of the piecewize Bezier curve and may provide continuity and smooth conjugation of adjacent ones of segments of the piecewize Bezier curve that are not segments corresponding to sharp angles of the contour. There not being a sufficient number of segments may be determined by the deviation of the piecewize Bezier curve exceeding a predefined threshold. The predefined threshold may correspond to a root mean square of the deviation being greater than two pixels. The optimization task may be provided using the formula:

$$\sum_{i,j} \|B(t_j^i) - C(t_j^i)\|^2 + \sum_i \left\| \frac{\partial B(t_n^i)}{\partial t} - \frac{\partial B(t_1^{i+1})}{\partial t} \right\|^2 \to \min$$

where $\|\cdot\|$ is a Euclidean distance, $t_j^i$ is a j-th count of an i-th segment of the contour, $t_n^i$ is a symbolic notation for a last count of an i-th segment and $t_1^{i+1}$ is a symbolic notation for a first count of a next i+1-st segment, and $B(t_j^i)$, $C(t_j^i)$, $\partial B(t)/\partial t$ are respectively coordinates on an i-th segment of the Bezier curve, an i-th segment of the contour, and tangent vectors at ends and beginnings of segments of the piecewize Bezier curve that are not segments corresponding to sharp angles of the contour. The optimization task may be solved using a banded matrix corresponding to a system of linear equations. A sharp angle may be determined by the presence of two distinct left and right tangent vectors where an angle between the two vectors falls below a predefined threshold. The predefined threshold may correspond to an angle between the left tangent vector and the right tangent vector being less than ninety degrees. Each location of high curvature may be determined by a change of direction of the tangent vector within the location exceeding a predefined threshold. The predefined threshold may correspond to an angle between two tangent vectors that are twenty pixels apart being greater than 90 degrees. The raster image may be captured and vectorized using a mobile device.

According further to the system described herein, a non-transitory computer-readable medium contains software that vectorizes a raster image. The software includes executable code that identifies a connectivity component in the raster image, executable code that detects a contour of the connectivity component, executable code that build tangent vectors for each point of the contour, executable code that, for each sharp angle of the contour, positions a segmentation point of two segments at a point thereof, executable code that, for each location of high curvature of the contour, positions segments proximal thereto, executable code that composes an optimization task to approximate a piecewize Bezier curve, executable code that solves the optimization task to provide a vectorization of the raster image, and executable code that, in response to there not being a sufficient number of segments, adds additional segments. The software may also include executable code that applies perspective, color, brightness and contrast correction to the raster image and building a binary black-white representation of the raster image prior to identifying the connectivity component. The optimization task may minimize a root-mean square deviation of the piecewize Bezier curve and may provide continuity and smooth conjugation of adjacent ones of segments of the piecewize Bezier curve that are not segments corresponding to sharp angles of the contour. There not being a sufficient number of segments may be determined by the deviation of the piecewise Bezier curve exceeding a predefined threshold. The predefined threshold may correspond to a root mean square of the deviation being greater than two pixels. The optimization task may be provided using the formula:

$$\sum_{i,j} \|B(t_j^i) - C(t_j^i)\|^2 + \sum_{i} \left\| \frac{\partial B(t_n^i)}{\partial t} - \frac{\partial B(t_1^{i+1})}{\partial t} \right\|^2 \to \min$$

where $\|\cdot\|$ is a Euclidean distance, $t_j^i$ is a j-th count of an i-th segment of the contour, $t_n^i$ is a symbolic notation for a last count of an i-th segment and $t_1^{i+1}$ is a symbolic notation for a first count of a next i+1-st segment, and $B(t_j^i)$, $C(t_j^i)\partial B(t)/\partial t$ are respectively coordinates on an i-th segment of the Bezier curve, an i-th segment of the contour, and tangent vectors at ends and beginnings of segments of the piecewize Bezier curve that are not segments corresponding to sharp angles of the contour. The optimization task may be solved using a banded matrix corresponding to a system of linear equations. A sharp angle may be determined by the presence of two distinct left and right tangent vectors where an angle between the two vectors falls below a predefined threshold. The predefined threshold may correspond to an angle between the left tangent vector and the right tangent vector being less than ninety degrees. Each location of high curvature may be determined by a change of direction of the tangent vector within the location exceeding a predefined threshold. The predefined threshold may correspond to an angle between two tangent vectors that are twenty pixels apart being greater than 90 degrees. The raster image may be captured and vectorized using a mobile device.

The proposed system builds a coordinated piecewise Bezier approximation of each contour (boundary) of a connectivity component of a raster image using pre-processing of the contour to define segmentation of the contour taking into account sharp angles and points of high curvature and using a global optimization function that reflects both the closeness of each Bezier segment to the original contour and a smooth conjugation of adjacent Bezier segments.

System functioning starts with an initial step of pre-processing a raster image where perspective, color, brightness and contrast correction are applied to the image and a binary black-white representation of the image is built. At a next pre-processing step, connectivity components of the binary image are identified and boundaries (contours) of the connectivity components are retrieved using any of a number of conventional techniques. Each contour is subject to vectorization by the system, which is performed as follows:

1. Left and right tangent vectors are built for each point of the contour (with due respect to quantization step of the curve). For points where the trajectory is smooth, the left and right vectors coincide. Divergence of the left and right tangent vectors is an indicator of an angle along the contour.
2. All relatively sharp angles on the contour are detected and serve as initial segmentation points for a piecewise Bezier approximation. In an embodiment, a sharp angle may be specified as a point on the trajectory where the left and right tangent vectors are distinct and form an angle less than 90 degrees.
3. Additional points of high curvature of the contour (small curvature radius but no sharp angle) are identified. For each identified point, an additional Bezier segment is designated by placing two extra segmentation points around the identified point between the identified point and a previously detected segmentation points from step 2. In an embodiment, curvature of the contour may be measured in each point of the contour as follows:
    a. A 10-pixel interval is taken in each direction from the point.
    b. Rotation of the tangent vector between the ends of the two intervals is measured as a change in direction of the tangent vector.
    c. If the change in direction is large enough, for example, larger than 90 degrees, the point is considered a high curvature point of the contour.
4. If a number of segmentation points on the contour is insufficient (for example, a long contour has just three segmentation points defined at steps 2, 3), additional segmentation points may be designated on the contour, for example, to split long portions of the contour that lack segmentation points from steps 2,3, into segments of roughly equal lengths. In an embodiment, addition of new segments may be driven by an approximation accuracy of the solution of the global optimization task, as explained below.
5. A global optimization task of approximation of the contour by a piecewise Bezier curve, one Bezier curve per segment, is formulated and solved. The task is defined by an objective function that takes into account three factors:

a. Minimization of the root-mean-square deviation of the piecewise Bezier curve from the contour.
b. Continuity of piecewise Bezier approximation—the end point of each segment is the same a starting point of the next segment.
c. Smooth conjugation of adjacent segments at each segmentation point, except for angles detected at step 2 (minimization of deviation between tangent vectors at an end of a segment and a start of the next segment).

Based on the above, an objective function may be presented as follows:

$$\sum_{i,j} \|B(t_j^i) - C(t_j^i)\|^2 + \sum_i^1 \left\| \frac{\partial B(t_n^i)}{\partial t} - \frac{\partial B(t_1^{i+1})}{\partial t} \right\|^2 \to \min$$

where $\|\cdot\|$ is the Euclidean distance; $t_j^i$ is a j-th count of an i-th segment of the contour, $t_n^i$ is a symbolic notation for a last count of an i-th segment and $t_1^{i+1}$ is a symbolic notation for a first count of the next i+1-st segment;

$$B(t_j^i), C(t_j^i), \frac{\partial B(t)}{\partial t}$$

are respectively coordinates on an i-th segment of the Bezier curve, an i-th segment of the original contour, and tangent vectors at the ends and beginnings of Bezier segments.

It should be noted that because of task segmentation, segment-by-segment task composition and adjacency of coordinated segments of the Bezier curve, a matrix of a system of linear equations that solve a minimization task has a banded structure and allows for a quick solution even for a high-dimensional task with a large number of segments on the original contour and the corresponding Bezier curve.

After the optimization task is solved, the quality of approximation of the contour by Bezier segments and the smoothness of conjugation of the segments may be additionally evaluated; if any of the quality indicators are insufficient, more segmentation points may be added and a new approximation step with a modified objective function that includes more segments may be conducted. In an embodiment, new segments may be added if the root mean square of the deviation is greater than two pixels.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for building high quality vector representations of raster images by using piecewise Bezier approximation of each contour on the original image with coordinated segment geometry designed to optimize characteristic points on the contour, such as sharp angles, non-angular points of high curvature, etc.

Figure 1:
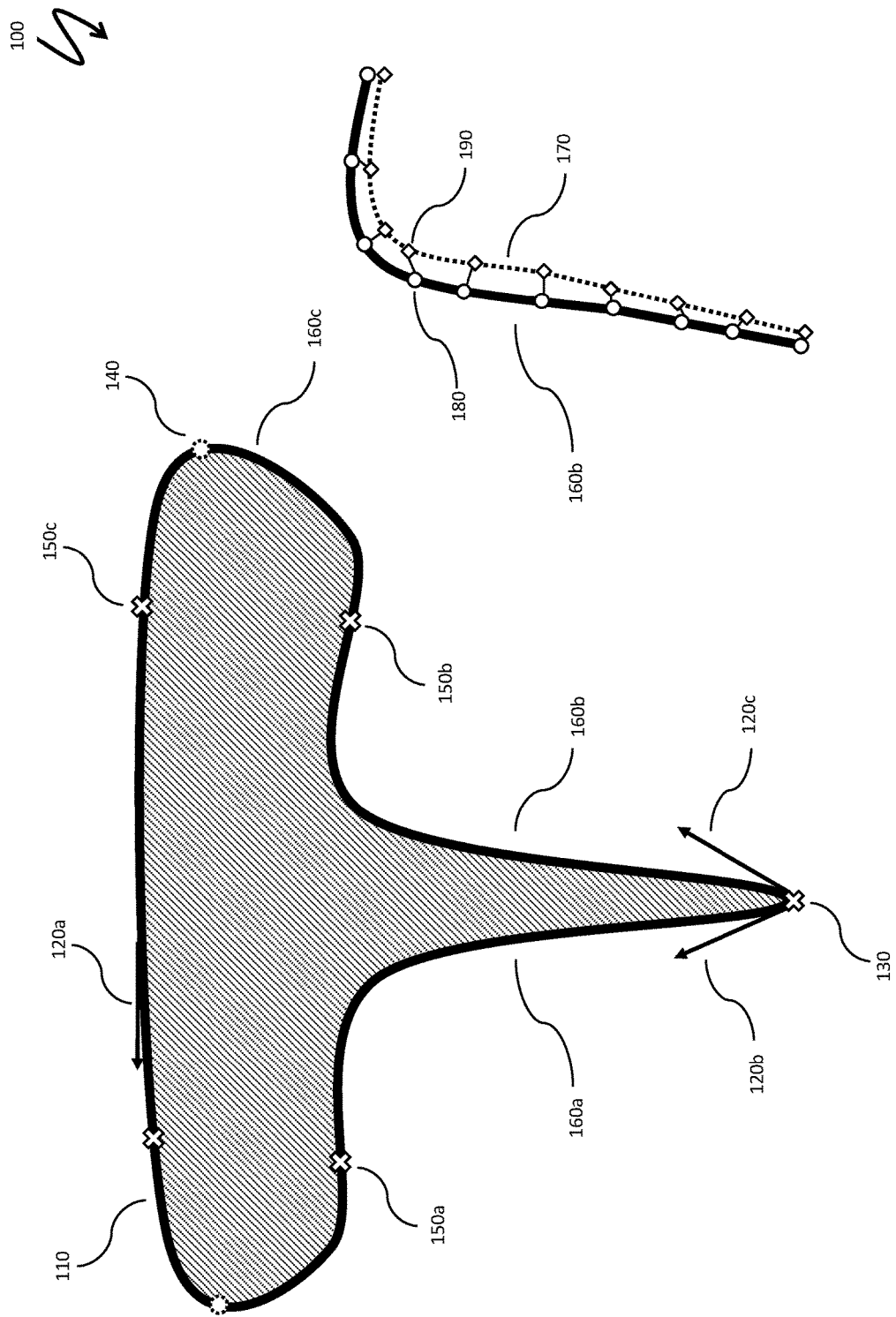
FIG. 1 is a schematic illustration of segmentation of a contour on a raster image, according to embodiments of the system described herein.

FIG. 1 is a schematic illustration 100 of segmentation of a contour on a raster image. A contour 110 corresponds to a connectivity component on a raster image, as explained elsewhere herein. The contour 110 is supplied with tangential vectors built along the contour 110, exemplified by a vector 120a for a point of low curvature and two vectors 120b, 120c built for a sharp angle 130 where the continuity of the tangential vector field may be breaking, so that a particular point on the contour may have a pair of tangential vectors (for a conventional counter-clockwise direction on the contour, the tangential vector 120b is a left tangential vector, while 120c is a right tangential vector).

Another type of characteristic points on the contour 110 detected by the system corresponds to points of relatively high curvature 140. After all characteristic points on the contour 110 have been identified by the system, segmentation points are added; as explained elsewhere herein, segmentation points may represent sharp angles on the contour and may surround points of high curvature. Segmentation points illustrated in FIG. 1 are points 150a, 150b, 150c and includes a point at the sharp angle 130. Subsequently, three sample segments on the contour 110 may be denoted as a segment 160a (between the segmentation point 150a and the point at the sharp angle 130), a segment 160b (between the point at the sharp angle 130 and the segmentation point 150b) and a segment 160c (between the segmentation points 150b, 150c).

A projection of the segment 160b is shown separately in FIG. 1, paired with a Bezier segment 170 used to build a vector approximation of the contour 110, as explained elsewhere herein. Additionally, several points 180 along the segment 160b of the contour 110 and corresponding points 190 on the Bezier segments 170 are shown.

Figure 2:
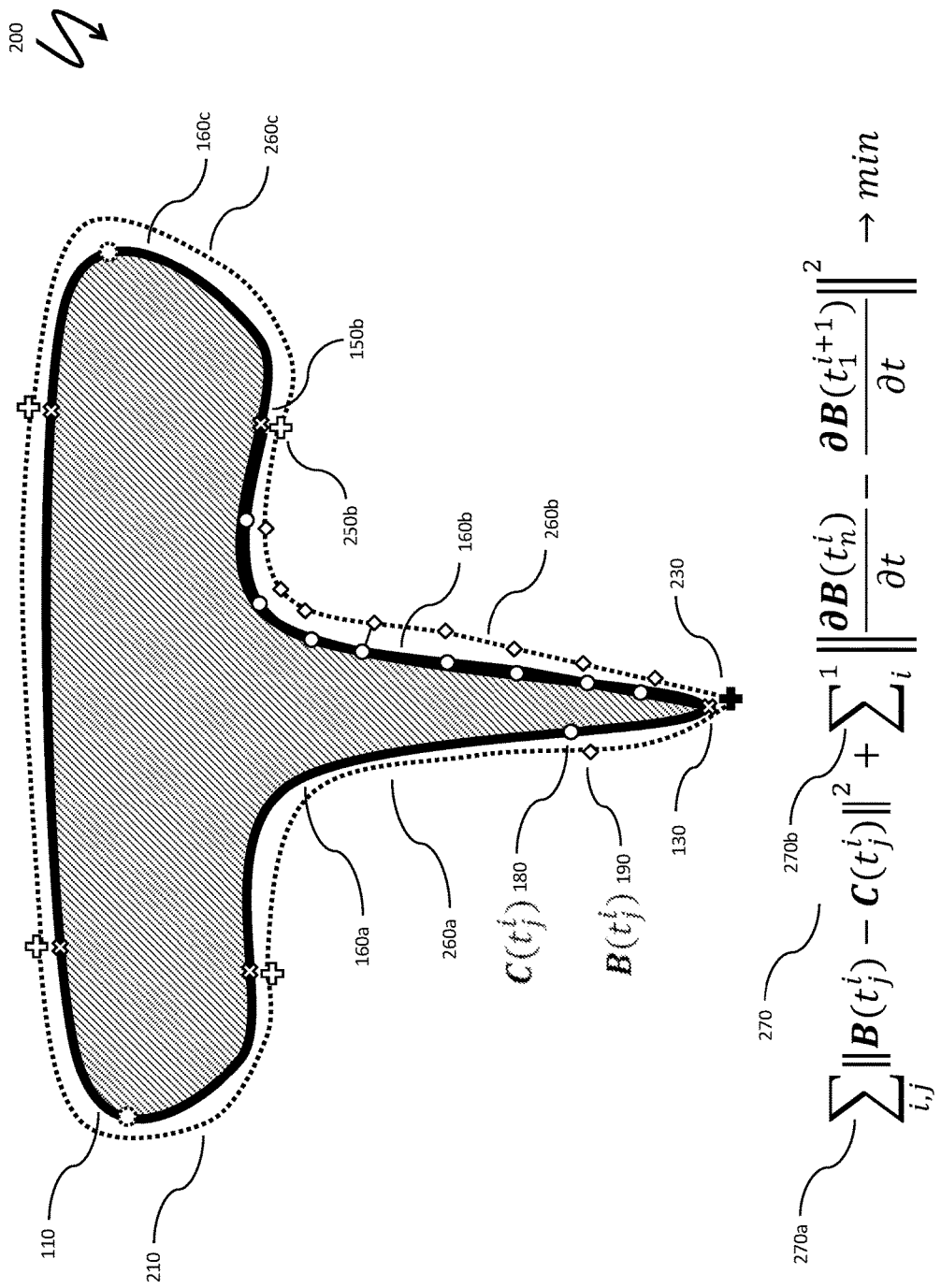
FIG. 2 is a schematic illustration of optimization of a piecewise Bezier approximation, according to embodiments of the system described herein.

FIG. 2 is a schematic illustration 200 of optimization of a piecewise Bezier approximation. The contour 110 is approximated by a segmented Bezier curve 210, so that the segments 160a, 160b, 160c are approximated by corresponding Bezier segments 260a, 260b, 260c. Additional ones of original and approximating segments are depicted in FIG. 2, but aren't enumerated. Accordingly, original segmentation points, such as the point at the sharp angle 130 and the point 150b (i.e. the beginning and the end of the original segment 160b) obtain analogs corresponding to segmentation points on the Bezier curve 210, such as points 230, 250b shown in FIG. 2.

Using notations $C(t_j^i)$ for the points 180 of the contour 110 and $B(t_j^i)$ for the points 190 on the corresponding Bezier curve 210 (a j-th count of an i-th segment), an optimization task 270 may be formulated. A first sum 270a applies to all points of every segment, while a second sum 270b (with the superscript 1) applies only to smooth conjugations of adjacent segments, such as at the point 250*b*; sharp angles, such as the point 230, are excluded (shown by a black filling of a corresponding cross mark).

Figure 3:
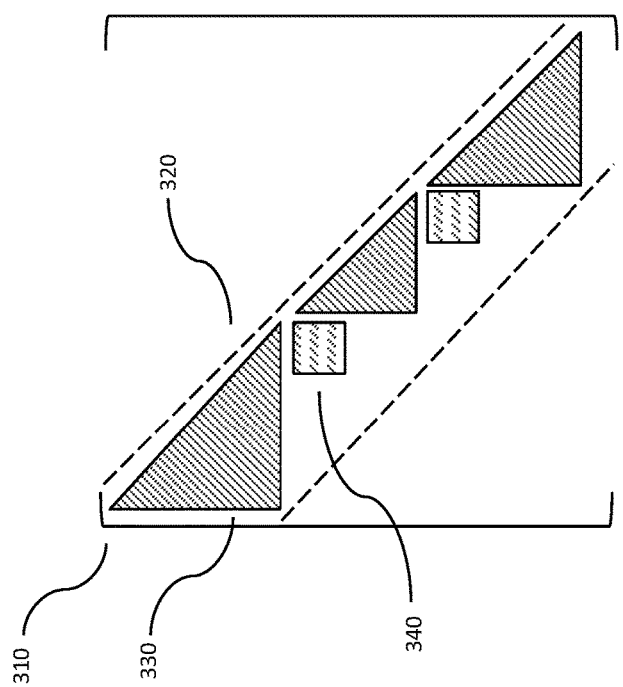
FIG. 3 is a schematic illustration of a banded matrix for a system of linear equations for the optimization task, according to embodiments of the system described herein.

FIG. 3 is a schematic illustration 300 of a banded matrix 310 for a system of linear equations for an optimization task. The matrix 310 of the system of linear equations is symmetric (so that only elements below a diagonal of the matrix are shown) and is contained within a relatively narrow band 320 containing triangles 330 and rectangles 340. Each of the triangles 330 represents an approximation of an original segment by a corresponding Bezier segment, i.e. the segments included in the sum 270*a* in FIG. 2. Each of the rectangles 330 represents a point of smooth conjugation between two adjacent segments of the Bezier curve, such as the point 250*b* in FIG. 2; the rectangles 340 correspond to the sum 270*b* in FIG. 2.

Figure 4:
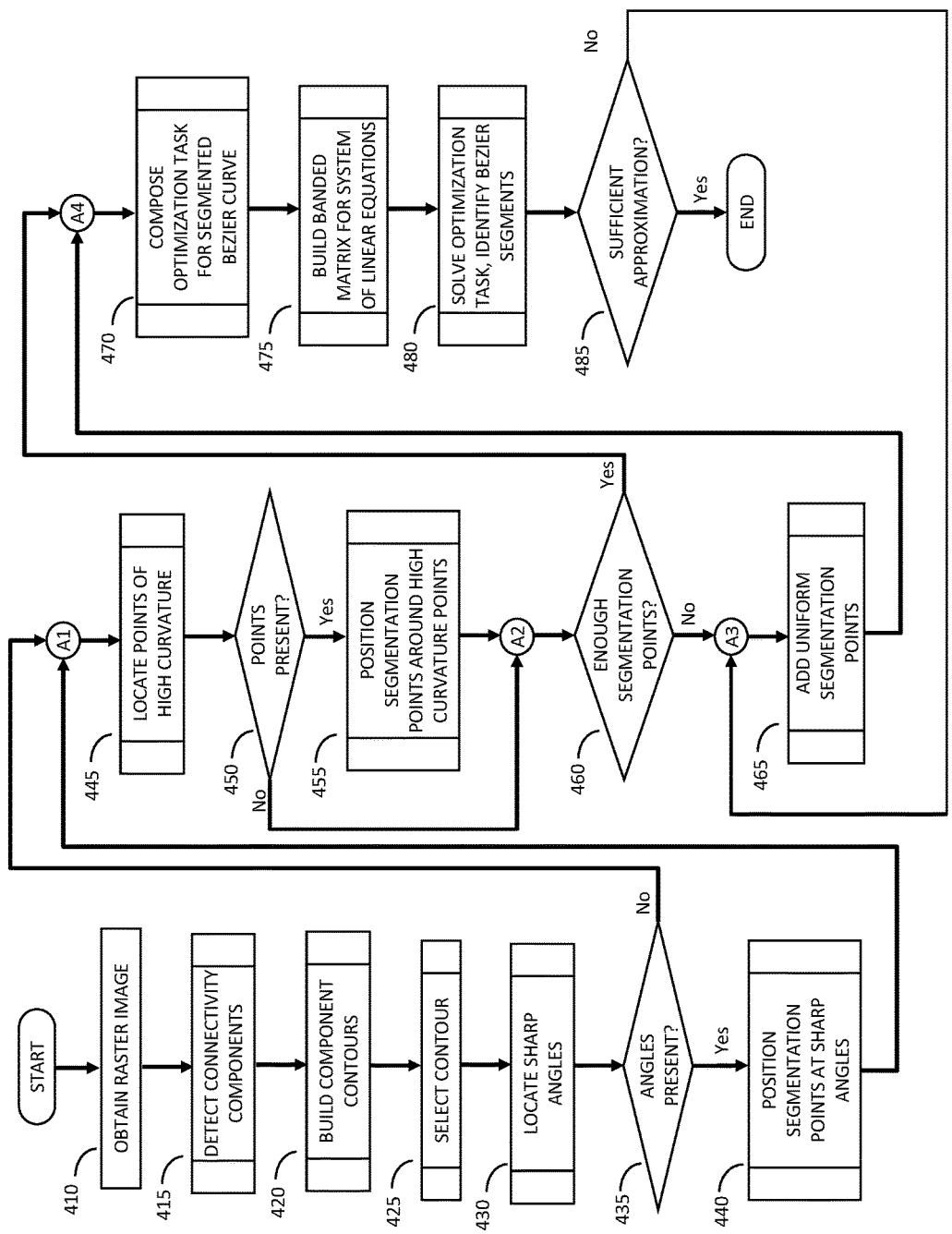
FIG. 4 is a system flow diagram illustrating processing performed in connection with coordinated piecewise Bezier vectorization, according to embodiments of the system described herein.

Referring to FIG. 4, a flow diagram 400 schematically illustrates processing performed in connection with coordinated piecewise Bezier vectorization. In an embodiment herein, processing illustrated by the flow diagram 400 may be provided using a mobile device, such as a mobile phone, that may or may not have been used to capturing an image on which piecewise Bezier vectorization is performed. Processing starts at a step 410 where a raster image is obtained. After the step 410, processing proceeds to a step 415, where the system detects connectivity components on the image. After the step 415, processing proceeds to a step 420, where the system builds contours for each connectivity component. After the step 420, processing proceeds to a step 425, where a contour is selected. The remainder of the flow diagram 400 describes the processing in connection with the single chosen contour.

After the step 425, processing proceeds to a step 430, where the system locates sharp angles on the contour (see, for example, FIG. 1 and the accompanying text related to the point at the sharp angle 130). After the step 430, processing proceeds to a test step 435, where it is determined whether any sharp angles are present. If so, processing proceeds to a step 440 where segmentation points of the original contour are positioned at points of the sharp angles. After the step 440, processing proceeds to a step 445, where the system locates points of high curvature on the original contour, as explained elsewhere herein. Note that the step 445 may be independently reached from the test step 435 in the event when there are no sharp angles on the contour.

After the step 445, processing proceeds to a test step 450, where it is determined whether any high curvature points are present. If so, processing proceeds to a step 455 where segmentation points of the contour are augmented with additional points positioned around high curvature points, as explained elsewhere herein. After the step 455, processing proceeds to a test step 460, where it is determined whether there are enough segmentation points on the contour. Note that the test step 460 may be independently reached from the test step 450 if no high curvature points were present on the contour. If there are not enough segmentation points on the contour, processing proceeds to a step 465 where uniform segmentation points are added along the contour. After the step 465, processing proceeds to a step 470 where an optimization task for identifying a segmented Bezier curve is composed, as explained elsewhere herein (see, in particular, FIG. 2 and the accompanying text).

After the step 470, processing proceeds to a step 475 where a banded matrix for the system of linear equations representing the optimization task is built (depicted in FIG. 3 and explained in the accompanying text). After the step 475, processing proceeds to a step 480 where the optimization task is solved and coordinated Bezier segments are identified. After the step 480, processing proceeds to a test step 485, where it is determined whether the approximation of the original contour is sufficient. If so, processing is complete; otherwise, processing proceeds back to the step 465 to add more segmentation points.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. Capturing of raster images may be done using smartphones, tablets and other mobile devices with embedded cameras, as well as conventional cameras, scanners and other hardware.

Software implementations of the system described herein may include executable code that is stored in a computer readable medium and executed by one or more processors, including one or more processors of a desktop computer. The desktop computer may receive input from a capturing device that may be connected to, part of, or otherwise in communication with the desktop computer. The desktop computer may include software that is pre-loaded with the device, installed from an app store, installed from media such as a CD, DVD, etc., and/or downloaded from a Web site. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of vectorizing a raster image, comprising:
   identifying a connectivity component in the raster image;
   detecting a contour of the connectivity component;
   building tangent vectors for each point of the contour;
   identifying one or more points of sharp angle on the contour, wherein there is a discontinuity of the tangent vectors for the contour at each of the one or more points of sharp angle, and a sharp angle is determined by a presence of two distinct left and right tangent vectors at each point of sharp angle where an angle between the two distinct left and right tangent vectors falls below a first predefined threshold;
   positioning a first segmentation point between two first adjacent segments of each identified point of shape angle;
   identifying one or more locations of high curvature in accordance with a determination that a change of direction of the tangent vectors corresponds to a predefined number of pixels at each location of high curvature and exceeds a second predefined threshold;

for each of the one or more locations of high curvature, positioning two second adjacent segments proximal to each location of high curvature, thereby connecting the respective location of high curvature to second segmentation points on the contour;

generating a piecewise Bezier curve to connect the first and second segmentation points to approximate the contour, the piecewise Bezier curve including two or more Bezier segments each of which is configured to connect two neighboring points of the first and second segmentation points;

in accordance with a determination that the piecewise Bezier curve a vectorization of the raster image; and in accordance with a determination that the piecewise Bezier curve does not match the contour, adding one or more substantially uniform segmentation points to create additional segments.

2. The method of claim 1, wherein the first predefined threshold corresponds to an angle between a left tangent vector and a right tangent vector, the angle being less than ninety degrees.

3. The method of claim 1, wherein for each location of high curvature, the predefined number of pixels is twenty or more such that pixels corresponding to the change of direction of the tangent vectors are at least 20 pixels parts, and the change of direction of the tangent vectors is greater than 90 degrees.

4. The method of claim 1, wherein the raster image is captured and vectorized using a mobile device.

5. The method of claim 1, further comprising:
applying perspective, color, brightness and contrast correction to the raster image; and
building a binary black-white representation of the raster image prior to identifying the connectivity component.

6. The method of claim 1, further comprising:
minimizing a root-mean square deviation of the piecewise Bezier curve from the contour; and
providing continuity and smooth conjugation of adjacent ones of the Bezier segments of the piecewize piecewise Bezier curve that are not the first segments corresponding to sharp angles of the contour.

7. The method of claim 6, wherein the determination that the piecewise Bezier curve does not match the contour is based on a determination that the deviation of the piecewise Bezier curve exceeds a predefined deviation threshold.

8. The method of claim 7, wherein the predefined deviation threshold corresponds to the root mean square deviation being greater than two pixels.

9. The method of claim 6, wherein the root-mean square deviation is minimized using the formula:

$$\sum_{i,j} \|B(t_j^i) - C(t_j^i)\|^2 + \sum_{i}^{1} \left\| \frac{\partial B(t_n^i)}{\partial t} - \frac{\partial B(t_1^{i+1})}{\partial t} \right\|^2 \to \min$$

where $\|\cdot\|$ is a Euclidean distance,
t is a pixel count on a segment of the contour,
$t_j^i$ is a j-th count of an 1-th segment of the contour,
$t_n^i$ is a symbolic notation for a last count of an 1-th segment and $t_1^{i+1}$ is a symbolic notation for a first count of a next i+1-st segment, and
$B(t_j^i)$, $C(t_j^i)$, $\partial B(t)/\partial t$ are respectively coordinates on an i-th segment of the Bezier curve, an i-th segment of the contour, and tangent vectors at ends and beginnings of segments of the piecewise Bezier curve that are not the first adjacent segments corresponding to sharp angles of the contour.

10. The method of claim 9, wherein the root-mean square deviation is minimized using a banded matrix corresponding to a system of linear equations.

11. A method, comprising:
identifying a connectivity component in a raster image;
detecting a contour of the connectivity component;
building tangent vectors for each point of the contour;
identifying one or more points of sharp angle on the contour, wherein there is a discontinuity of the tangent vectors for the contour at each of the one or more points of sharp angle;
positioning a first segmentation point between two first adjacent segments of each identified point of shape angle;
identifying one or more locations of high curvature in accordance with a determination that a change of direction of the tangent vectors corresponds to a predefined number of pixels at each location of high curvature and exceeds a second predefined threshold;
for each of the one or more locations of high curvature, positioning two second adjacent segments proximal to each location of high curvature, thereby connecting the respective location of high curvature to second segmentation points on the contour;
generating a piecewise Bezier curve to connect the first and second segmentation points to approximate the contour, the piecewise Bezier curve including two or more Bezier segments each of which is configured to connect two neighboring points of the first and second segmentation points;
minimizing a root-mean square deviation of the piecewise Bezier curve from the contour;
providing continuity and smooth conjugation of adjacent ones of the Bezier segments of the piecewise Bezier curve that are not the first segments corresponding to sharp angles of the contour;
in accordance with a determination that the piecewise Bezier curve matches the contour, providing a vectorization of the raster image; and
in accordance with a determination that the piecewise Bezier curve does not match the contour, adding one or more substantially uniform segmentation points to create additional segments.

12. The method of claim 11, wherein the determination that the piecewise Bezier curve does not match the contour is based on a determination that the deviation of the piecewise Bezier curve exceeds a predefined deviation threshold.

13. The method of claim 12, wherein the predefined deviation threshold corresponds to the root mean square deviation being greater than two pixels.

14. The method of claim 11, wherein the root-mean square deviation is minimized using the formula:

$$\sum_{i,j} \|B(t_j^i) - C(t_j^i)\|^2 + \sum_{i}^{1} \left\| \frac{\partial B(t_n^i)}{\partial t} - \frac{\partial B(t_1^{i+1})}{\partial t} \right\|^2 \to \min$$

where $\|\cdot\|$ is a Euclidean distance,
t is a pixel count on a segment of the contour,
$t_j^i$ is a j-th count of an i-th segment of the contour, $t_n^i$ is a symbolic notation for a last count of an 1-th segment and $t_1^{i+1}$ is a symbolic notation for a first count of a next i+1-st segment, and $B(t_j^i)$, $C(t_j^i)$, $\partial B(t)/\partial t$ are respectively coordinates on an i-th segment of the Bezier curve, an i-th segment of the contour, and tangent vectors at ends and beginnings of segments of the piecewise Bezier curve that are not the first adjacent segments corresponding to sharp angles of the contour.

15. The method of claim 14, wherein the root-mean square deviation is minimized using a banded matrix corresponding to a system of linear equations.

16. The method of claim 11, wherein a sharp angle is determined by a presence of two distinct left and right tangent vectors at each point of sharp angle where an angle between the two distinct left and right tangent vectors falls below a first predefined threshold.

17. The method of claim 16, wherein the first predefined threshold corresponds to an angle between a left tangent vector and a right tangent vector being less than ninety degrees.

18. The method of claim 11, wherein for each location of high curvature, the predefined number of pixels is twenty or more such that pixels corresponding to the change of direction of the tangent vectors are at least 20 pixels parts, and the change of direction of the tangent vectors is greater than 90 degrees.

19. The method of claim 11, wherein the raster image is captured and vectorized using a mobile device.

20. A non-transitory computer-readable medium containing software for vectorising a raster image, the software comprising executable codes for:

after obtaining the raster image, applying perspective, color, brightness and contrast correction to the raster image and building a binary black-white representation of the raster image;

identifying a connectivity component in the raster image;

detecting a contour of the connectivity component;

building tangent vectors for each point of the contour;

identifying one or more points of sharp angle on the contour, wherein there is a discontinuity of the tangent vectors for the contour at each of the one or more points of sharp angle;

positioning a first segmentation point between two first adjacent segments of each identified point of shape angle;

identifying one or more locations of high curvature in accordance with a determination that a change of direction of the tangent vectors corresponds to a predefined number of pixels at each location of high curvature and exceeds a second predefined threshold;

for each of the one or more locations of high curvature, positioning two second adjacent segments proximal to each location of high curvature, thereby connecting the respective location of high curvature to second segmentation points on the contour;

generating a piecewise Bezier curve to connect the first and second segmentation points to approximate the contour, the piecewise Bezier curve including two or more Bezier segments each of which is configured to connect two neighboring points of the first and second segmentation points;

in accordance with a determination that the piecewise Bezier curve matches the contour, providing a vectorization of the raster image; and in accordance with a determination that the piecewise Bezier curve does not match the contour, adding one or more substantially uniform segmentation points to create additional segments.

21. The non-transitory computer-readable medium of claim 20, wherein a sharp angle is determined by a presence of two distinct left and right tangent vectors at each point of sharp angle where an angle between the two distinct left and right tangent vectors falls below a first predefined threshold.

22. The non-transitory computer-readable medium of claim 21, wherein the first predefined threshold corresponds to an angle between a left tangent vector and a right tangent vector being less than ninety degrees.

23. The non-transitory computer-readable medium of claim 20, wherein for each location of high curvature, the predefined number of pixels is twenty or more such that pixels corresponding to the change of direction of the tangent vectors are at least 20 pixels parts, and the change of direction of the tangent vectors is greater than 90 degrees.

24. The non-transitory computer-readable medium of claim 20, wherein the raster image is captured and vectorized using a mobile device.

* * * * *

UNITED STATES PATENT AND TRADEMARK OFFICE
CERTIFICATE OF CORRECTION

PATENT NO. : 10,212,457 B1
APPLICATION NO. : 15/349543
DATED : February 19, 2019
INVENTOR(S) : Livshitz et al.

Page 1 of 1

It is certified that error appears in the above-identified patent and that said Letters Patent is hereby corrected as shown below:

In the Claims

Claim 1, Column 9, Line 15, please delete "Bezier curve a" and insert --Bezier curve matches the contour, providing a--;

Claim 9, Column 9, Line 62, please delete "an 1-th segment" and insert --an $i$-th segment--;

Claim 9, Column 9, Line 63, please delete "an 1-th segment" and insert --an $i$-th segment--;

Claim 14, Column 11, Line 1, please delete "an 1-th segment" and insert --an $i$-th segment--.

Signed and Sealed this
Seventh Day of May, 2019

Andrei Iancu
*Director of the United States Patent and Trademark Office*